(12) United States Patent
Akashi et al.

(10) Patent No.: US 9,902,282 B2
(45) Date of Patent: Feb. 27, 2018

(54) POWER SUPPLY DEVICE FOR VEHICLE (71) Applicant: Mitsubishi Electric Corporation, Chiyoda-ku, Tokyo (JP)

(72) Inventors: Yohei Akashi, Tokyo (JP); Hideyuki Tanaka, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 979 days.

(21) Appl. No.: 14/167,608

(22) Filed: Jan. 29, 2014

(65) Prior Publication Data

US 2014/0346865 A1 Nov. 27, 2014

(30) Foreign Application Priority Data

May 23, 2013 (JP) .................. 2013-108825

(51) Int. Cl.
*H02H 7/18* (2006.01)
*B60L 11/18* (2006.01)
*B60L 1/00* (2006.01)
*B60L 11/00* (2006.01)

(52) U.S. Cl.
CPC ............. *B60L 11/1851* (2013.01); *B60L 1/00* (2013.01); *B60L 11/005* (2013.01); *B60L 11/1861* (2013.01); *B60L 2240/445* (2013.01); *B60L 2240/547* (2013.01); *Y02T 10/7005* (2013.01); *Y02T 10/705* (2013.01); *Y02T 10/7022* (2013.01); *Y02T 10/7044* (2013.01)

(58) Field of Classification Search
USPC ........................................ 307/10.7
See application file for complete search history.

(56) References Cited

U.S. PATENT DOCUMENTS

2003/0110771 A1 6/2003 Morgan et al.

FOREIGN PATENT DOCUMENTS

| JP | 06-346747 A | 12/1994 |
| JP | 2003-161157 A | 6/2003 |
| JP | 2009-207316 A | 9/2009 |
| JP | 2011-097771 A | 5/2011 |
| JP | 2012-034527 A | 2/2012 |
| JP | 2013-090410 A | 5/2013 |

OTHER PUBLICATIONS

Japanese Office Action dated Mar. 4, 2014, Patent Application No. 2013-108825, Partial.
Japanese Office Action issued Jun. 10, 2014, Patent Application No. 2013-108825, Partial.

*Primary Examiner* — Rexford Barnie
*Assistant Examiner* — Dru Parries
(74) *Attorney, Agent, or Firm* — Sughrue Mion, PLLC; Richard C. Turner (57) ABSTRACT

A power supply device for a vehicle has connection changeover means for alternatively changing a connection of a capacitor and a battery over to any one of a parallel connection of the capacitor and the battery, a series connection of the capacitor and the battery and an independent connection of the capacitor and the battery. Electrical power is selectively supplied to a electric supercharger by any one of a parallel connection circuit of the capacitor and the battery, a series connection circuit of the capacitor and the battery and an independent connection circuit of the capacitor and the battery whose connection of the capacitor and the battery are alternatively changed over to by the connection changeover means.

13 Claims, 8 Drawing Sheets

POWER SUPPLY DEVICE FOR VEHICLE

BACKGROUND OF THE INVENTION

Field of the Invention

The present invention relates to a power supply device that suppresses an influence on on-vehicle electrical equipment caused by an operation of an electric supercharger that is arranged in an intake air passage of an internal combustion engine and is driven by an electric motor. In particular, the present invention relates to a power supply device for a vehicle which uses two power supplies such as a battery and a capacitor that can be charged and discharged in a short time compared to the battery.

Background Art

In recent years, engine downsizing with supercharger technology is widely used as one of fuel economy improvement measures of an internal combustion engine. The engine downsizing with supercharger technology supercharges the internal combustion engine by means of a supercharger to increase a power output and reduce an engine displacement while the same power output is maintained. The downsizing of the engine displacement can reduce pumping loss or mechanical losses to improve fuel economy. There has been developed an electric supercharger to which an electric motor is attached to improve transient responsiveness of the supercharger and to compensate for an insufficient supercharging of the supercharger at low engine speeds.

When the electric supercharger is driven, a large current necessary for a large power output flows to the electric supercharger. For this reason, there is a possibility that voltage drop or voltage fluctuation occurs across battery terminals to adversely affect other on-vehicle electrical equipment.

For example, Patent Document 1 proposes a technology in which, when the power output of the electric supercharger is equal to or greater than a threshold value, a power supply system for the electric supercharger and a generator are disconnected from other on-vehicle electrical equipment or the battery, the electric supercharger is driven by power generation of the generator, and other electrical equipment are driven by a battery power. In this way, voltage fluctuation in the battery caused by a large electrical power consumption of the electric supercharger is suppressed from adversely affecting other electrical equipment.

In addition, for example, in Patent Document 2, the battery and a capacitor are used as power supplies for the electric supercharger, the capacitor with good charging and discharging characteristics is used to drive the electric supercharger at an initial drive phase, and thereafter, the battery and the capacitor are connected in parallel to each other to drive the electric supercharger.

[Patent Document 1] JP-A-2003-161157
[Patent Document 2] JP-A-6-346747

However, in Patent Document 1, when the electric supercharger is driven, the generator supplies electrical power to the electric supercharger, but, there is a possibility that, since the generator is driven by engine power, the power output of the engine is reduced not to deliver an acceleration which a driver demands. In addition, when power generation of the generator is increased, an engine load is increased and fuel economy is worsened.

In addition, in Patent Document 2, since the capacitor has characteristics that a voltage of the capacitor is decreased depending on SOC, the battery and the capacitor are connected in parallel to each other, and the capacitor takes most electrical power from the battery to drive the electric supercharger while the SOC remains as it is. When large electrical power is frequently input to and output from the battery, the battery is deteriorated.

SUMMARY OF THE INVENTION

An object of the present invention is to provide a power supply device that can suppress an adverse influence on other on-vehicle electrical equipment caused by voltage drop or voltage fluctuation which occurs due to a driving of an electric supercharger to stably supply electrical power to the electric supercharger and that can suppress deterioration of the battery to realize long useful life of the battery.

According to an aspect of the present invention, there is provided a power supply device for a vehicle equipped with a battery which is an electricity storage device that supplies electrical power to on-vehicle electrical equipment including an electric supercharger that is arranged in an intake air passage of an internal combustion engine and is driven by an electric motor; and a capacitor that can be charged and discharged in a short time compared to the battery. The power supply device has connection changeover means for alternatively changing a connection of the capacitor and the battery over to any one of a parallel connection of the capacitor and the battery, a series connection of the capacitor and the battery and an independent connection of the capacitor and the battery. Electrical power is selectively supplied to the electric supercharger by any one of a parallel connection circuit of the capacitor and the battery, a series connection circuit of the capacitor and the battery and an independent connection circuit of the capacitor and the battery whose connection of the capacitor and the battery are alternatively changed over to by the connection changeover means.

According to the aspect of the present invention, the power supply device for the vehicle equipped with a battery which is an electricity storage device that supplies electrical power to on-vehicle electrical equipment, includes an electric supercharger that is arranged in an intake air passage of an internal combustion engine and is driven by an electric motor; and a capacitor that can be charged and discharged in a short time compared to the battery. The power supply device has connection changeover means for alternatively changing a connection of the capacitor and the battery over to any one of a parallel connection of the capacitor and the battery, a series connection of the capacitor and the battery and an independent connection of the capacitor and the battery. Since electrical power is selectively supplied to the electric supercharger by any one of a parallel connection circuit of the capacitor and the battery, a series connection circuit of the capacitor and the battery and an independent connection circuit of the capacitor and the battery whose connection of the capacitor and the battery are alternatively changed over to by the connection changeover means, the power supply device can suppress an adverse influence on other on-vehicle electrical equipment caused by voltage drop or voltage fluctuation which occurs due to the driving of the electric supercharger to stably supply electrical power to the electric supercharger and can suppress deterioration of the battery to realize long useful life of the battery.

The foregoing and other objects, features, aspects, and advantages of the present invention will become more apparent from the following detailed description of the present invention when taken in conjunction with the accompanying drawings.

DETAILED DESCRIPTION OF THE INVENTION

Embodiment 1

Hereinafter, an embodiment of the present invention will be described with reference to the accompanying drawings.

Figure 1:
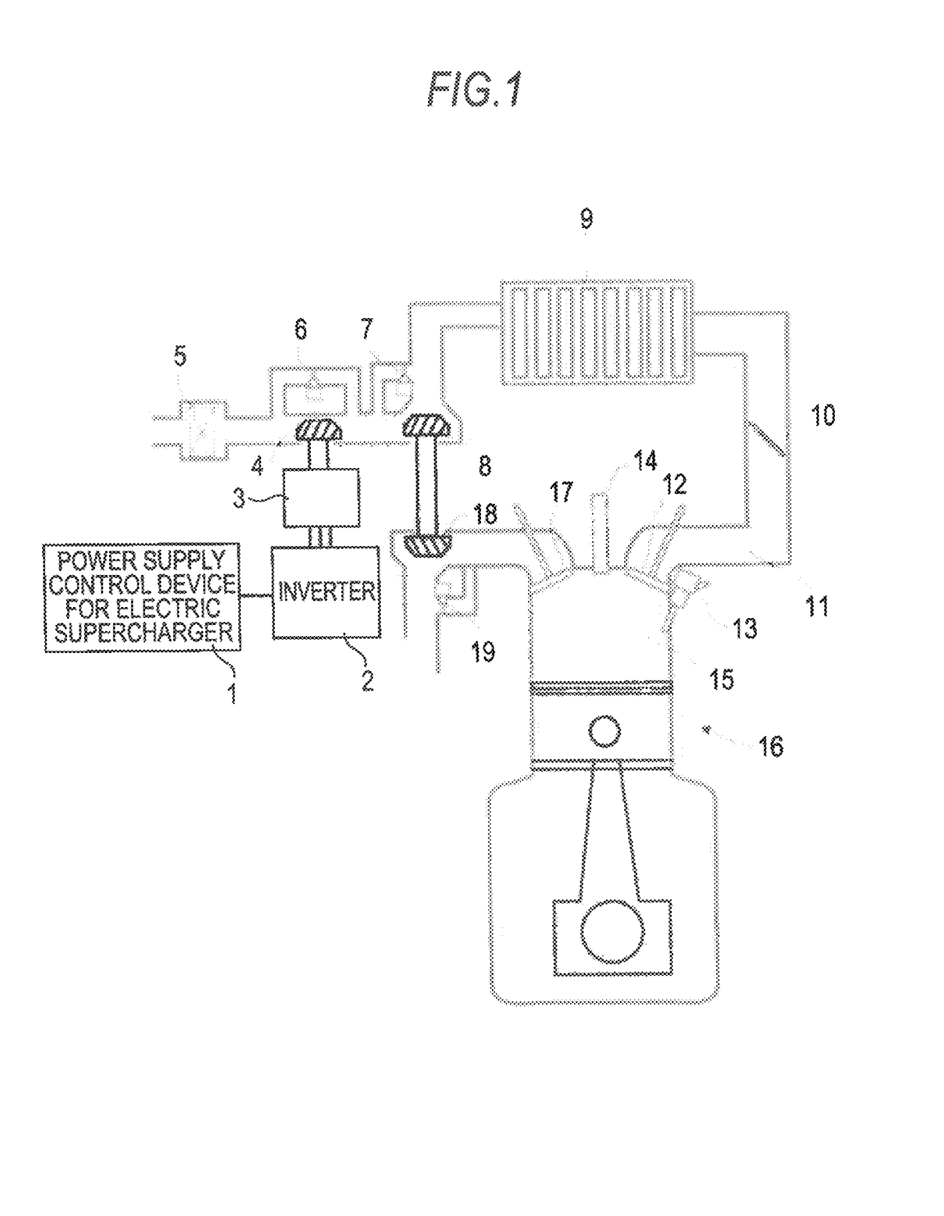
FIG. 1 is a configuration view of an entire gasoline engine equipped with an electric supercharger according to Embodiment 1 of the present invention.

FIG. 1 is a view illustrating an entire configuration of a gasoline engine equipped with an electric supercharger according to the embodiment of the present invention and illustrates one example of preferable forms.

A gasoline engine 16 is a multi cylinder engine and is illustrated by a cross-sectional view of only one cylinder. An internal combustion engine described in the embodiment is a multi cylinder gasoline engine, but the internal combustion engine may be a diesel engine or a rotary engine. In addition, in a fuel injection method, the embodiment can be applied to not only a direct injection engine in which fuel is injected by an injector 13 attached to a cylinder 15 but also a port injection engine in which fuel is injected into an intake manifold 11 downstream of a throttle valve 10.

A driving of the gasoline engine equipped with the electric supercharger will be described with reference to FIG. 1. First, an air cleaner 5 removes dust from air which is taken in from the atmosphere. Subsequently, air passes through a passage upstream of a compressor and is compressed by a compressor impeller 4 of the electric supercharger. The compressor impeller 4 of an electric motor 3 has a configuration in which the compressor impeller 4 is coaxial with the electric motor 3 and can be driven by power of the electric motor 3. When air is not required to be compressed by the compressor impeller 4, a bypass valve 6 is open to bypass intake air.

Subsequently, intake air passes through a compressor 8 of a mechanical turbocharger and is further compressed when a flow rate of exhaust gas is sufficient and the compressor 8 is rotated by a turbine wheel 18. Herein, when the throttle valve 10 downstream of the compressor 8 is closed during the compression (supercharging) of intake air by the compressor 8, a supercharging pressure in an intake air passage from the compressor 8 to the throttle valve 10 is excessively increased, and thus, a blowoff valve 7 is open to recirculate intake air upstream of the compressor 8.

Since temperature of the compressed air is increased due to an increase in air pressure, the compressed air is cooled down by an intercooler 9 in order to improve charging efficiency. Air or air/fuel mixture in a port injection engine is sucked into the engine 16 depending on an opening angle of the throttle valve 10 which is driven by an actuator. When an intake vale 12 is open, the supercharged air is charged into the cylinder 15 and ignited to be burned by a spark plug 14. Combustion gas is discharged via an exhaust valve 17 to drive the turbine wheel 18 of the mechanical turbocharger. In addition, since an excessive increase in a supercharging pressure causes abnormal combustion such as knocking or preignition in the engine, exhaust gas is bypassed via a wastegate 19 when intake air is not required to be compressed by the compressor 8.

Figure 2:
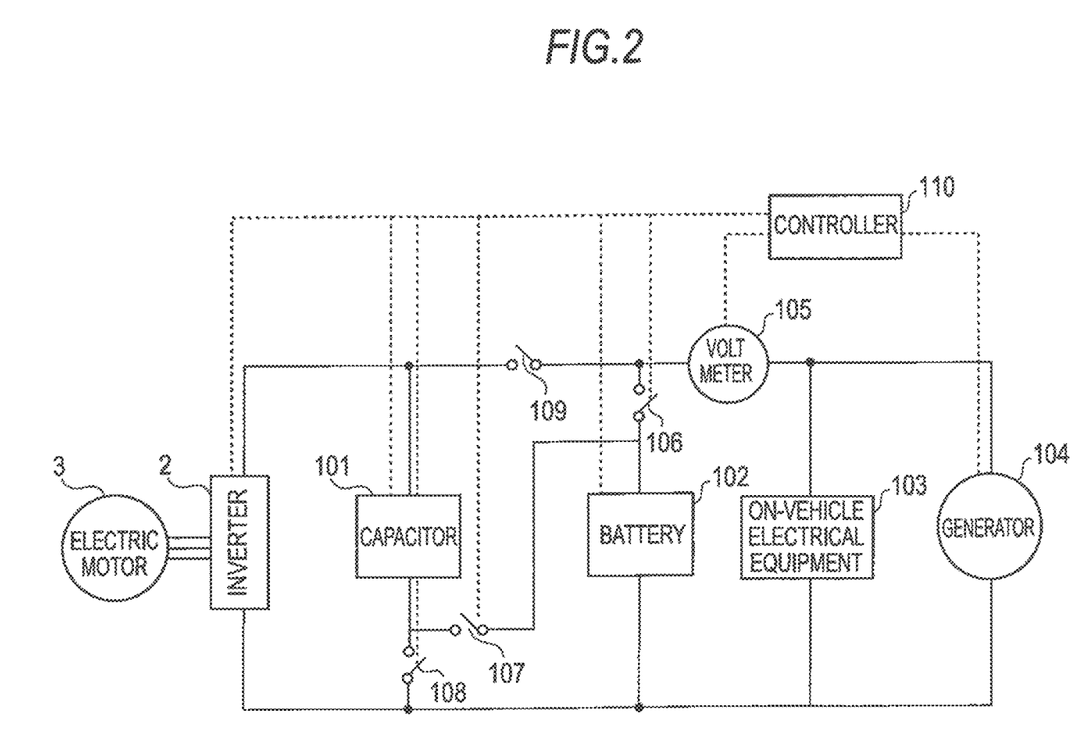
FIG. 2 is a configuration view of an entire power supply control device for a vehicle equipped with the electric supercharger according to Embodiment 1 of the present invention.

FIG. 2 is a configuration view of an entire power supply control device of the electric supercharger according to the embodiment. In FIG. 2, the power supply control device for electrical supercharging is mainly configured to have the electric motor 3; an inverter 2 that drives and controls the electric motor 3; a capacitor 101 and a battery 102 that are power supplies for a vehicle; an on-vehicle electrical equipment 103; a generator 104; a volt meter 105 that detects a bus voltage of a power supply system; on/off switches 106, 107, 108 and 109 which change a state of a connection of two power supplies; and a controller 110 that controls the on/off switches.

The electric motor 3 is attached upstream of the mechanical turbocharger that is driven by means of exhaust gas energy, the electric motor 3 aids supercharging when supercharging by the mechanical turbocharger is insufficient. Supercharging by the mechanical turbocharger is insufficient in a low engine speed area where a flow rate of engine exhaust gas is insufficient or a high torque area. In addition, the mechanical turbocharger may be an electric assist turbocharger in which an electric motor is attached to a compressor and turbine shaft. Since the inverter 2 drives and controls the electric motor 3, the inverter 2 is operated by request from the controller 110.

The generator 104 is an alternator or a motor generator and converts energy from a power unit of the internal combustion engine to electrical energy. The generator 104 according to the present invention charges the capacitor 101 or the battery 102 and supplies electrical power to the electric supercharger, the on-vehicle electrical equipment 103 and the like. The on-vehicle electrical equipment 103 is electrical equipment such as a starter that starts an engine, a car audio or a head lamp.

A lead-acid battery is used as the battery 102, and a double-layered electricity storage device with good charging and discharging characteristics is used as the capacitor 101. The capacitor typically has better charging and discharging characteristics than the lead-acid battery, but since a voltage of the capacitor is decreased due to decrease in SOC, the lead-acid battery and the capacitor mutually complement defects thereof.

The controller 110 has means for detecting an internal state of the capacitor; means for detecting an internal state of the battery; and means for detecting a bus voltage, and the controller 110 performs a calculation based on detection states of the capacitor, the battery and the bus voltage and requests from an upper-level ECU to the electric supercharger. In addition, the controller 110 controls the on/off switches 106, 107, 108 and 109 to control a state where two power supplies are connected to each other. In the embodiment, the controller 110 controls the on/off switches 106, 107, 108 and 109, but, for example, an on/off switch-controlling function may be integrated into the inverter 2, the upper-level ECU or the like.

Figure 3:
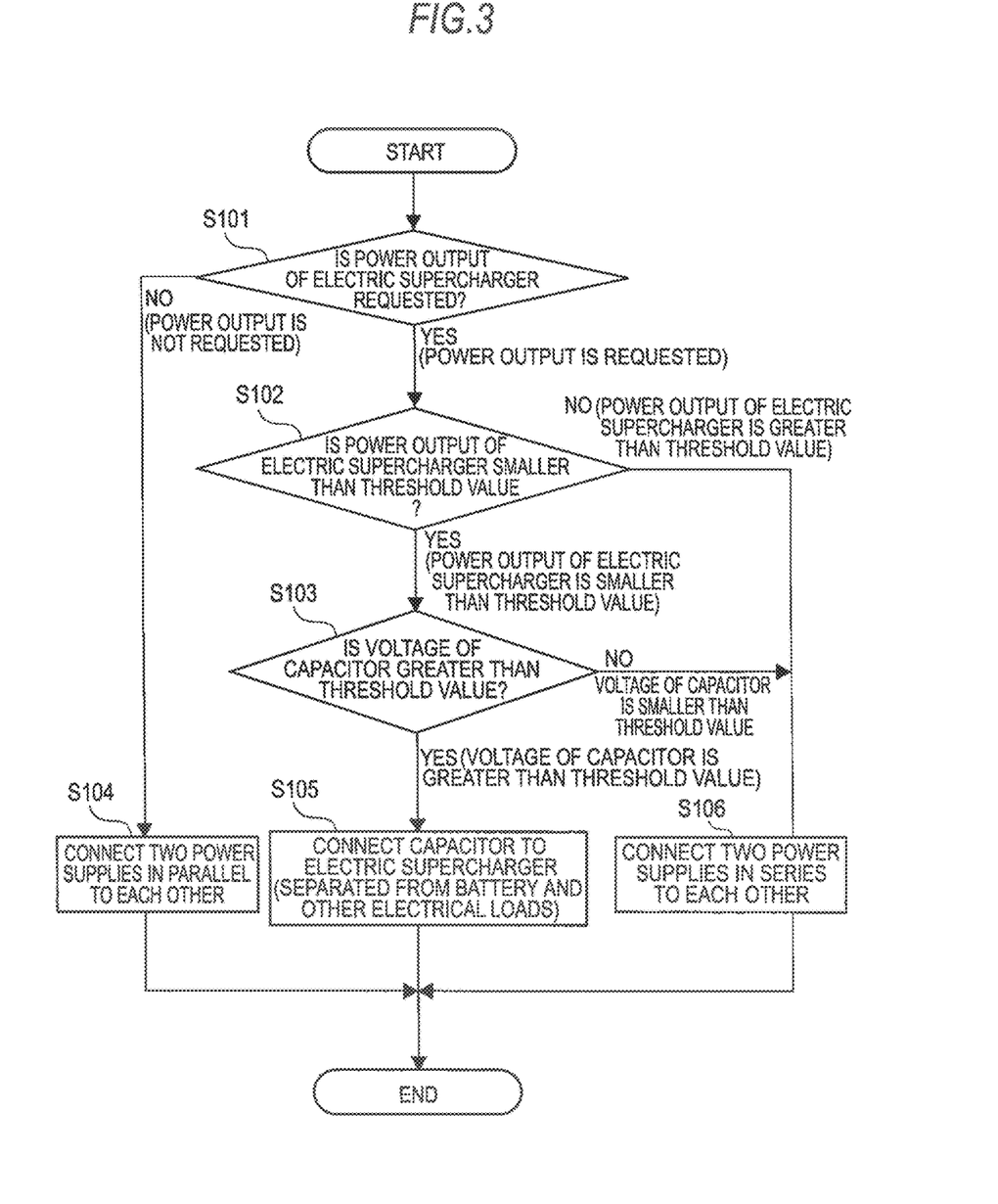
FIG. 3 is a flow chart illustrating a process of the power supply control device when the electric supercharger according to Embodiment 1 of the present invention is operated.
Figure 5:
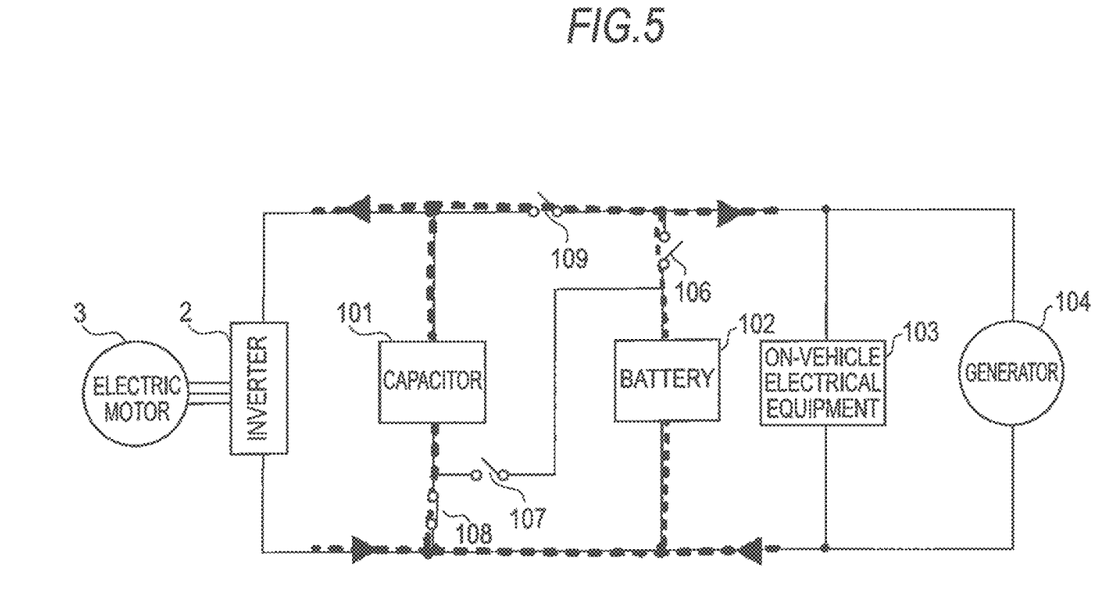
FIG. 5 is a connection view when a power supply device for the vehicle according to Embodiment 1 of the present invention connects two power supplies in series with each other.

FIG. 3 is a flow chart illustrating a process in which two power supplies are connected to each other when electric supercharging according to the embodiment is required. In response to acceleration by a driver, the ECU of the vehicle commands an acceleration request based on an engine speed or torque of the internal combustion engine, and thus, a power output of the electric supercharger is requested. In S101, it is determined whether or not a power output of the electric supercharger is requested, and when the power output of the electric supercharger is not requested, two power supplies are connected in parallel to each other in S104. The parallel connection indicates a state where the on/off switches 106, 108 and 109 are closed and the on/off switch 107 is open (FIG. 5). In the parallel connection, a current output which is instantaneously pulled out is improved.

Figure 6:
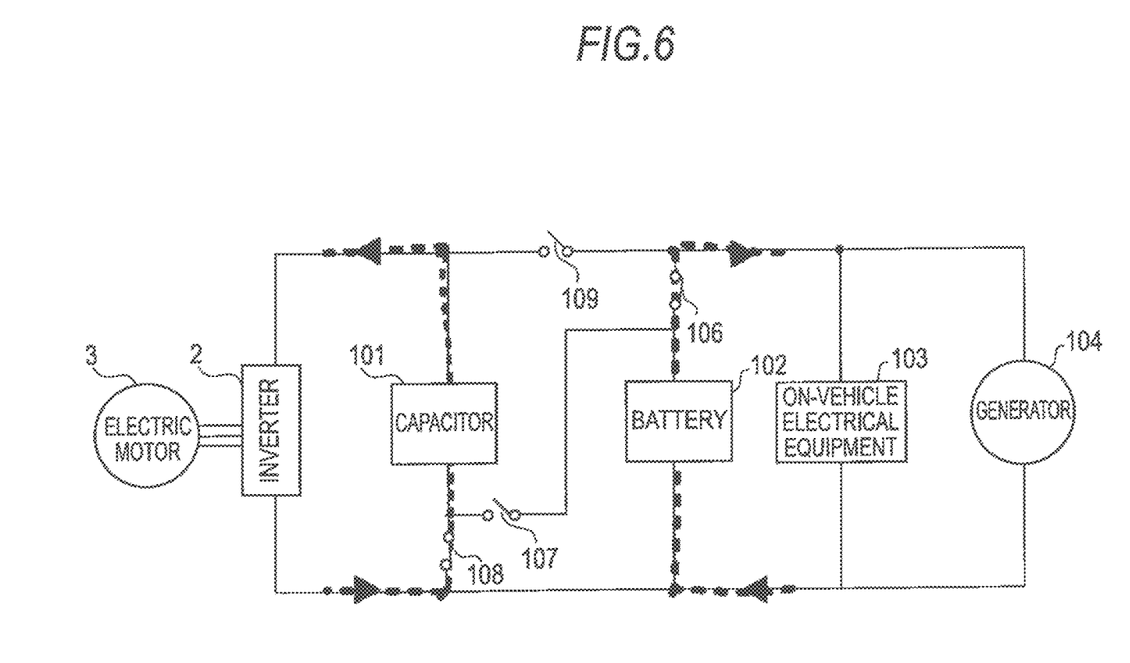
FIG. 6 is a connection view when the power supply device for the vehicle according to Embodiment 1 of the present invention connects two power supplies in parallel with each other.

In a case where a power output of the electric supercharger is requested in S101, when a requested power output of the electric supercharger is smaller than a predetermined threshold value in the controller 110 in S102 and a voltage or SOC of the capacitor is larger than a predetermined threshold value in the controller 110 in S103, the two power supplies are connected independently from each other where the capacitor supplies electrical power to only the electric supercharger and the battery supplies electrical power to other on-vehicle electrical equipment in S105. The independent connection indicates a state where the on/off switches 106 and 108 are closed and the on/off switches 107 and 109 are open (FIG. 6). In this way, it is possible to eliminate an influence on other on-vehicle electrical equipment such as an audio.

Herein, a series connection is not illustrated in the flow chart, but the two power supplies may be connected in series to each other when a power output of the electric supercharger is requested. In the series connection, a battery voltage and a capacitor voltage are added to form a voltage, and thus, even though voltage fluctuation or voltage drop is present when the electric supercharger is operated, an influence on other electrical equipment is eliminated and equivalent effects are obtained.

Figure 7:
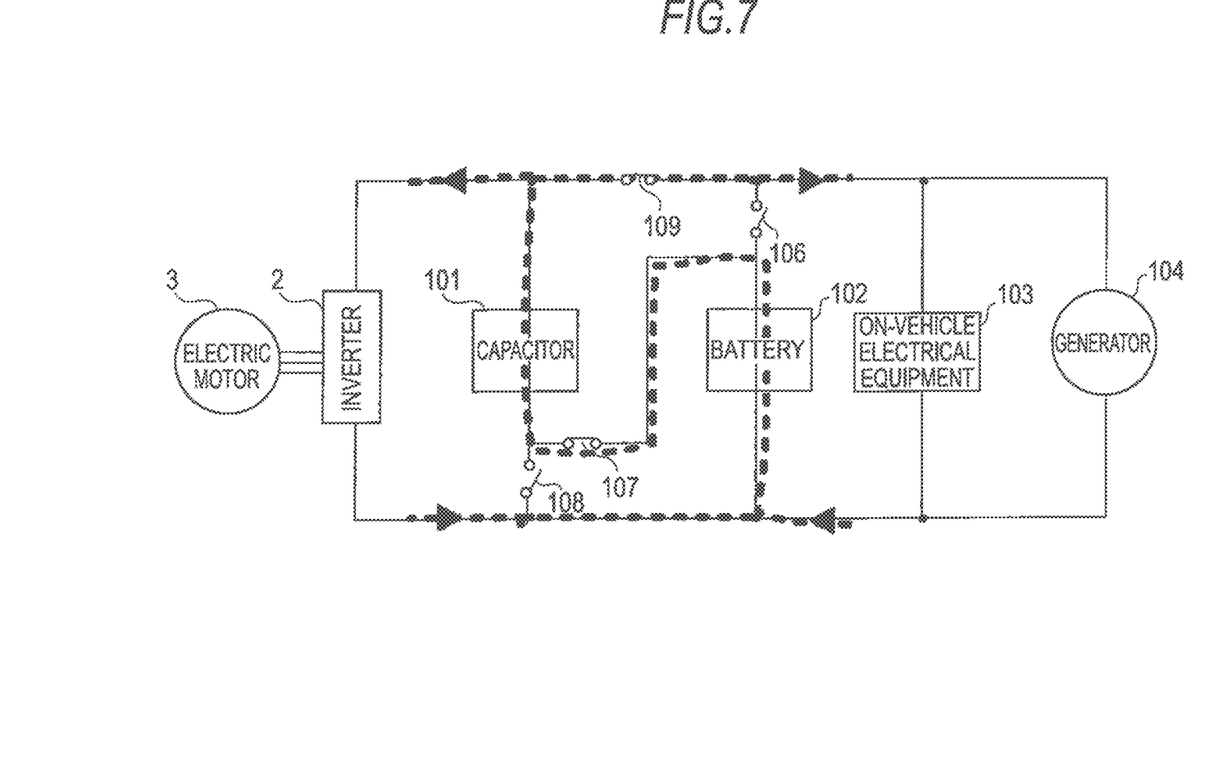
FIG. 7 is a connection view when the power supply device for the vehicle according to Embodiment 1 of the present invention connects two power supplies independently from each other.

In a case where a power output of the electric supercharger is requested in S101, when a requested power output of the electric supercharger exceeds a threshold value in S102, a connection of the two power supplies is changed over to the series connection in S106. The series connection indicates a state where the on/off switches 107 and 109 are closed and the on/off switches 106 and 108 are open (FIG. 7). Since the series connection has a high bus voltage compared to the parallel connection, supercharging of the electric supercharger can be performed until a high power output is reached and a voltage drop can be simultaneously prevented with respect to electrical loads such as the electric supercharger with a high power output. In this way, it is possible to eliminate an influence on other on-vehicle electrical equipment such as an audio. In addition, when the two connections with the same power output are compared to each other, the series connection can reduce a current, and thus, the series connection can contribute to loss reduction and improve efficiency of the electric supercharger. Even in a case where a power output of the electric supercharger does not exceed a threshold value, when a voltage or SOC of the capacitor is smaller than a threshold value, the electric supercharger is difficult to be operated, and thus, the two power supplies are connected in series to each other. When an output voltage of the generator 104 is small, a voltage of the capacitor 101 is small. Herein, the controller 110 has means for changing a threshold value for a requested power output of the electric supercharger which is used to determine a connection changeover, based on a connection state, and the threshold value has hysteresis characteristics and thus, the connection is prevented from being frequently changed around the threshold value.

In addition, a power generation mode is not illustrated in the flow chart, but when a SOC or voltage of the capacitor is decreased at an operation condition such as an uphill driving of the vehicle where a power output of the electric supercharger continues to be requested, power generation is performed by the generator 104. Since engine power is used by the generator, a power output of the engine is decreased. However, since energy used by the electric supercharger is a large amount of energy compared to the power output of the engine, a power output of the engine becomes large when supercharging is performed with power generation being performed compared to when electrical supercharging is stopped.

Figure 4:
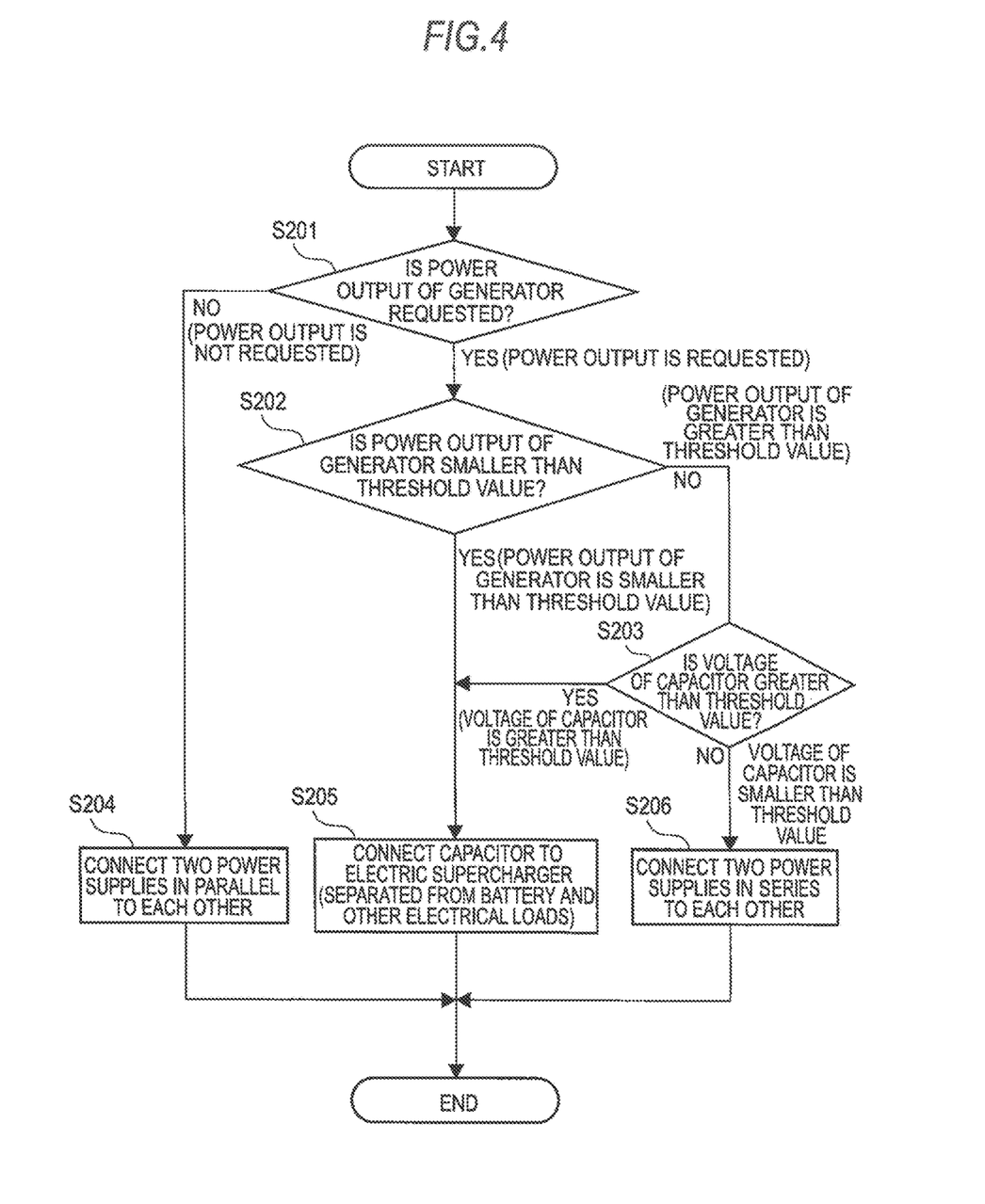
FIG. 4 is a flow chart illustrating a process of the power supply control device at an operation of a generator according to Embodiment 1 of the present invention.

FIG. 4 is a flow chart illustrating a process in which the two power supplies are connected to each other when power generation is requested according to the embodiment, and when the power generation is requested, the connection of the two power supplies will be described with reference to FIG. 4. In cases where deceleration energy is desired to be aggressively recovered: for example, in a case where a SOC of an electricity storage device such as the battery or the capacitor is basically decreased; in a case where a driver's drive mode is not in an acceleration mode; or the like, power generation is requested by the upper-level ECU. In S201, it is determined whether or not a power output of the generator is requested, and when the power output of the generator is not requested, the two power supplies are connected in parallel to each other in S204. The parallel connection indicates a state where the on/off switches 106, 108 and 109 are closed and the on/off switch 107 is open (FIG. 5). In the parallel connection, current acceptance characteristics are improved, and voltage fluctuation of the bus voltage is small.

In a case where a power output of the generator is requested in S201, when a requested power output of the generator exceeds a predetermined threshold value in the controller 110 in S202 and a voltage or SOC of the capacitor is equal to or smaller than a predetermined threshold value in the controller 110 in S203, a connection of the two power supplies is changed over to the series connection in S206. The series connection indicates a state where the on/off switches 107 and 109 are closed and the on/off switches 106 and 108 are open (FIG. 7). Since the series connection has a high bus voltage compared to the parallel connection, power generation of the generator can be performed until a high power output is reached. In addition, when the two connections with the same power output are compared to each other, the series connection can reduce a current, and thus, the series connection can contribute to loss reduction and improve efficiency of the generator.

When a requested power output of the generator is lower than a predetermined threshold value in the controller 110 in S202, or when a voltage or SOC of the capacitor is larger than a predetermined threshold value in the controller 110 in S203, the capacitor is independently connected from the battery to be separated therefrom in S205 in such a manner that the capacitor is overcharged so as not to catch fire. The independent connection indicates a state where the on/off switches 106 and 108 are closed and the on/off switches 107 and 109 are open (FIG. 6). Herein, the controller 110 has means for changing a threshold value for a requested power output of the generator which is used to determine a connection changeover, based on a connection state, and the threshold value has hysteresis characteristics and thus, the connection is prevented from being frequently changed around the threshold value.

Herein, a configuration is not illustrated in the drawings, but the configuration may be configured to have a rectifier circuit such as a diode in a circuit of controlling a connection of the two power supplies. For example, the on/off switch 107 flows a current from the battery to the capacitor and the on/off switch 108 flows a current from the ground to the capacitor, unidirectionally. Since the rectifier circuit is provided in such a manner that a current unidirectionally flows, short circuits of the power supplies can be prevented even though the on/off switches are not operated when the connection of the two power supplies is changed over to other connection states.

In addition, the series or parallel connection of the two power supplies may be changed over to each other based on a SOC or voltage of the battery. That is, in a case where the battery is deteriorated when a starter or a motor generator is driven during engine start-up, the battery is connected in series to the capacitor such that the engine start-up is made possible.

Figure 8:
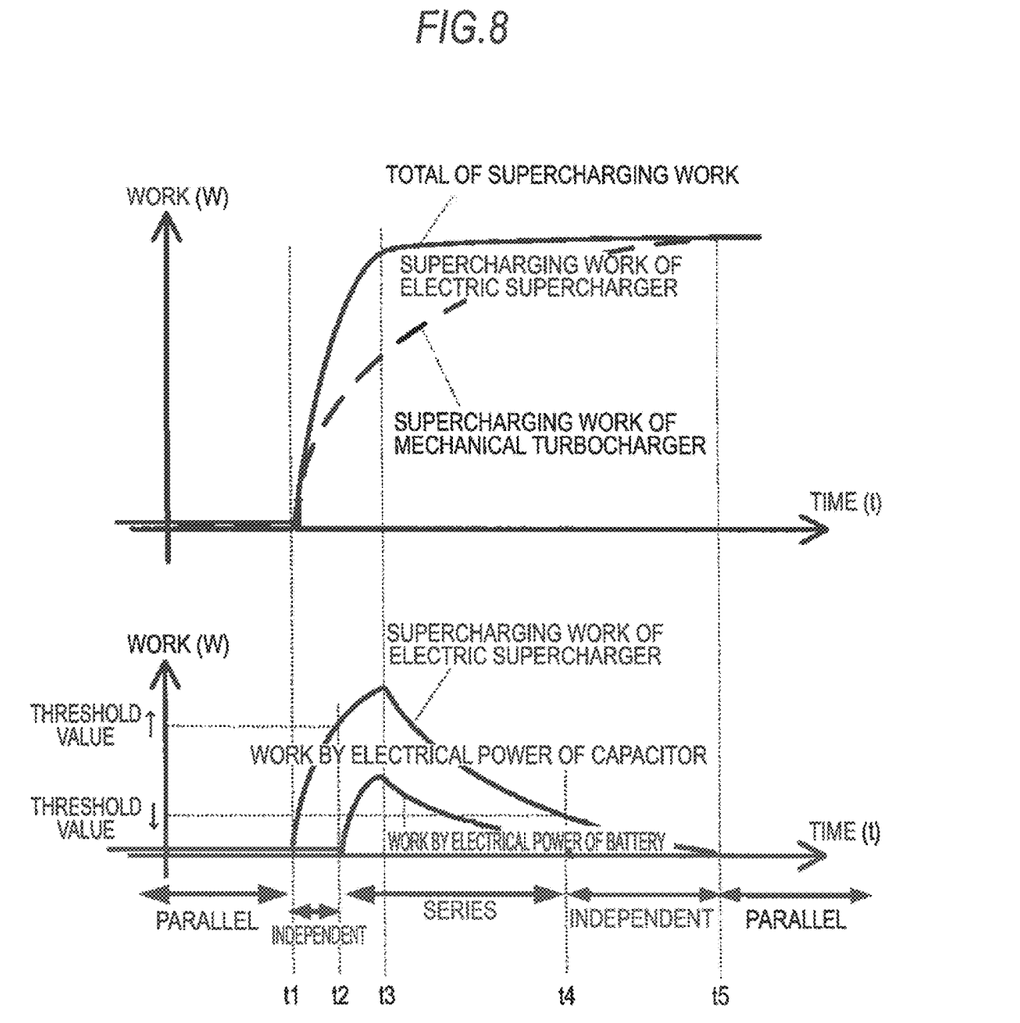
FIG. 8 is a view illustrating a relation between supercharging work and electric power from the power supplies when the electric supercharger according to Embodiment 1 of the present invention is operated.

FIG. 8 illustrates an operation when electric supercharging is requested according to the embodiment and an example of effects obtained by the operation. A total of supercharging work by the electric supercharger is requested by the upper-level ECU, and the total of supercharging work is basically approximate to an acceleration request which a driver demands and is preferably performed in a step-like response in which a time between times t1 and t3 is short.

Herein, since supercharging work of the mechanical turbocharger is required to be raised from the time t1 to a time t5 and is referred to as turbo lag caused by a small flow rate of engine exhaust gas, the electric supercharger compensates for the turbo lag. That is, the supercharging work of the mechanical turbocharger is subtracted from the total of supercharging work requested by the upper-level ECU to form the requested supercharging work of the electric supercharger. Herein, the supercharging work of the mechanical turbocharger may be obtained by a predetermined mapping in the ECU or may be calculated based on an intake air flow of the engine, a supercharging pressure or the like.

Subsequently, since electrical power is supplied to the motor of the electric supercharger and the inverter to produce supercharging work of the electric supercharger, a relation between the supercharging work and electrical power relates to efficiencies of the motor and inverter and efficiency of the compressor. In regard to the supercharging work of the electric supercharger, a method of electrical power supply from a two-power supply system with the battery and the capacitor will be described. The power supply device of the electric supercharger enters the parallel connection prior to the time t1 by which the electrical supercharging is not performed, and the power supply device of the electric supercharger enters the independent connection to supply electrical power from the capacitor at the time t1 when the electrical supercharging is requested.

Since the requested power output of the electric supercharger exceeds a threshold value at the time t2, two power supplies of the capacitor and the battery are connected in series to each other. Herein, in a one-power supply system with either one of the capacitor and the battery, a voltage is not obtainable, a power output of the electric supercharger is not producible, and a driver demanded acceleration is not obtainable. Subsequently, since the requested power output of the electric supercharger is lower than a threshold value at the time t4, the power supply device enters the independent connection to supply electrical power only from the capacitor. Finally, the power supplies are connected in parallel to each other to charge the capacitor after the time t5.

As such, according to the embodiment, a connection of the two-power supply system is changed over to other connection states and thus, a battery power can be aggressively suppressed from being used. A capacitor with good input and output characteristics is aggressively used as a power supply which supplies electrical power necessary for the electric supercharging, and frequency in use of the electric supercharger is high since the electric supercharger is used whenever an acceleration request occurs, for example, whenever a driver hits an acceleration pedal. However, inputs and outputs of electrical power input from the battery are reduced, and thus a useful life of the battery can be extended.

The present invention can be applied to any power supply system regardless of a voltage and can be applied to high-voltage power supply systems ranging from a 12 V power supply system in the related art to 16 V, 24 V, 48 V, and 100 V to 1000 V power supply systems.

In the embodiment, the lead-acid battery is used as a first electricity storage device, but an AGM battery with better charging and discharging characteristics may be used. The capacitor is used as a second electricity storage device, but the same effects can be obtained even with other lithium-ion or nickel-metal hydride batteries with better charging and discharging characteristics.

As described above, the Embodiment 1 has the following characteristics.

Characteristic 1: A power supply control device for a vehicle equipped with an electric supercharger has a battery which is an electricity storage device for the electric supercharger that is arranged in an intake air passage of an internal combustion engine and is driven by an electric motor and on-vehicle electrical equipment including the electric supercharger; and a capacitor that can be charged and discharged in a short time compared to the battery. The power supply control device has electrical connection changeover means for being able to select means for supplying electrical power to the electric supercharger from an independent connection of the capacitor, a series connection of the capacitor and the battery and a parallel connection of the capacitor and the battery.

Characteristic 2: In Characteristic 1, the power supply control device for the vehicle calculates a requested power output of the electric supercharger based on a drive mode of the vehicle and controls the power supply connection changeover means in response to the requested power output of the electric supercharger.

Characteristic 3: In Characteristic 1 or 2, the power supply control device for the vehicle has means for detecting an internal state of the capacitor and controls a generator and the power supply connection changeover means based on the internal state of the capacitor.

Characteristic 4: In any one of Characteristics 1 to 3, the power supply control device for the vehicle has the generator that performs power generation using a power of the internal combustion engine, calculates a requested power output of the generator based on a drive mode of the vehicle, and controls the power supply connection changeover means in response to the requested power output of the generator.

Characteristic 5: In any one of Characteristics 1 to 4, the power supply control device for the vehicle has means for detecting a bus voltage of the power supplies to which the electric supercharger, the generator, a starter that starts up the internal combustion engine and other on-vehicle equipment are connected, and the power supply control device for the vehicle controls the power supply connection changeover means based on the bus voltage.

Characteristic 6: In any one of Characteristics 1 to 5, the power supply control device for the vehicle has means for detecting an internal state of the battery and changes a value for determining the power supply connection changeover based on the internal state of the battery.

Characteristic 7: In any one of Characteristics 1 to 6, the power supply control device for the vehicle changes a value for determining the power supply connection changeover based on a state of a connection of the power supplies.

Characteristic 8: In the power supply control device for the vehicle according to any one of Characteristics 1 to 7, a power supply connection changeover circuit has a rectifier circuit which allows a current to unidirectionally flow through the power supply connection changeover circuit.

In addition, from a different point of view, Embodiment 1 has the following characteristics, as described above.

Characteristic 1b: A power supply device for a vehicle equipped with a battery which is an electricity storage device that supplies electrical power to on-vehicle electrical equipment including an electric supercharger that is arranged in an intake air passage of an internal combustion engine and is driven by an electric motor; and a capacitor that can be charged and discharged in a short time compared to the battery. The power supply device has connection changeover means for alternatively changing a connection of the capacitor and the battery over to any one of a parallel connection of the capacitor and the battery, a series connection of the capacitor and the battery and an independent connection of the capacitor and the battery. Electrical power is selectively supplied to the electric supercharger by any one of a parallel connection circuit of the capacitor and the battery, a series connection circuit of the capacitor and the battery and an independent connection circuit of the capacitor and the battery whose connection of the capacitor and the battery are alternatively changed over to by the connection changeover means.

Characteristic 2b: In the power supply device for vehicle according to Characteristic 1b, the connection changeover means performs the alternative connection changeover in response to a requested power output of the electric supercharger based on a drive mode of the vehicle.

Characteristic 3b: In the power supply device for vehicle according to Characteristic 1b or 2b, the connection changeover means performs the alternative connection changeover based on a state of charge of the capacitor.

Characteristic 4b: In the power supply device for vehicle according to any one of Characteristics 1b to 3b, the connection changeover means performs the alternative connection changeover in response to a requested power output of a generator that performs power generation using a power of the internal combustion engine of the vehicle, which is based on a drive mode of the vehicle.

Characteristic 5b: In the power supply device for vehicle according to any one of Characteristics 1b to 4b, the connection changeover means performs the alternative connection changeover based on a bus voltage of the power supplies to which the electric supercharger; a generator that performs power generation using a power of the internal combustion engine of the vehicle; a starter that starts up the internal combustion engine; and other on-vehicle equipment are connected.

Characteristic 6b: In the power supply device for vehicle according to any one of Characteristics 1b to 5b, the connection changeover means performs the alternative connection changeover based on a state of charge of the battery.

Characteristic 7b: In the power supply device for vehicle according to any one of Characteristics 1b to 6b, a value for determining whether or not the connection changeover means is required to perform the alternative connection changeover can be changed.

Characteristic 8b: The power supply device for vehicle according to any one of Characteristics 1b to 7b further includes, rectifying means for allowing a current to unidirectionally flow in the circuit in which the connection changeover means performs the alternative connection changeover.

As such, the embodiment of the present invention has been described, but the present invention is not limited to the embodiment described herein. It is apparent to those skilled in the art that other various embodiments can be made possible in the scope of the present invention. Each embodiment of the present invention can be appropriately modified and omitted in the scope of the present invention.

The same numerals in each of the drawings indicate the same or equivalent portions.

Various modifications and alternations of this invention will be apparent to those skilled in the art without departing from the scope and spirit of this invention, and it should be understood that this is not limited to the illustrative embodiments set forth herein.

What is claimed is:

1. A power supply device for a vehicle equipped with a battery which is an electricity storage device that supplies electrical power to on-vehicle electrical equipment including an electric supercharger that is arranged in an intake air passage of an internal combustion engine and is driven by an electric motor; and a capacitor that can be charged and discharged in a short time compared to the battery, the power supply device comprising:
   a controller for alternatively changing a connection of the capacitor and the battery over to any one of a parallel connection of the capacitor and the battery, a series connection of the capacitor and the battery, and an independent connection of the capacitor and the battery,
   wherein electrical power is selectively supplied to the electric supercharger by any one of a parallel connection circuit of the capacitor and the battery, a series connection circuit of the capacitor and the battery, and an independent connection circuit of the capacitor whose connection of the capacitor is alternatively changed over to by the controller,
   wherein the controller performs the series connection circuit of the capacitor and the battery based on a requested power output of the electric supercharger based on a drive mode of the vehicle exceeding a threshold value.

2. The power supply device for the vehicle according to claim 1,
   wherein the controller performs the alternative connection changeover in response to a requested power output of the electric supercharger based on a drive mode of the vehicle.

3. The power supply device for the vehicle according to claim 1,
   wherein the controller performs the alternative connection changeover based on a state of charge of the capacitor.

4. The power supply device for the vehicle according to claim 2,
   wherein the controller performs the alternative connection changeover based on a state of charge of the capacitor.

5. The power supply device for the vehicle according to claim 1,
   wherein the controller performs the alternative connection changeover in response to a requested power output of a generator that performs power generation using a power of the internal combustion engine of the vehicle, which is based on a drive mode of the vehicle.

6. The power supply device for the vehicle according to claim 4,
   wherein the controller performs the alternative connection changeover in response to a requested power output of a generator that performs power generation using a power of the internal combustion engine of the vehicle, which is based on a drive mode of the vehicle.

7. The power supply device for the vehicle according to claim 1,
   wherein the controller performs the alternative connection changeover based on a bus voltage of the power supplies to which the electric supercharger; a generator that performs power generation using a power of the internal combustion engine of the vehicle; a starter that starts up the internal combustion engine; and other on-vehicle equipment are connected.

8. The power supply device for the vehicle according to claim 6,
   wherein the controller performs the alternative connection changeover based on a bus voltage of the power supplies to which the electric supercharger; the generator that performs power generation using a power of the internal combustion engine of the vehicle; a starter that starts up the internal combustion engine; and other on-vehicle equipment are connected.

9. The power supply device for the vehicle according to claim 1,
   wherein the controller performs the alternative connection changeover based on a state of charge of the battery.

10. The power supply device for the vehicle according to claim 8,
    wherein the controller performs the alternative connection changeover based on a state of charge of the battery.

11. The power supply device for the vehicle according to claim 1,
    wherein a value for determining whether or not the controller is required to perform the alternative connection changeover can be changed.

12. The power supply device for the vehicle according to claim 1, further comprising:
    rectifier circuit for allowing a current to unidirectionally flow in the circuit in which the contoller performs the alternative connection changeover.

13. The power supply device for the vehicle according to claim 11, further comprising:
    rectifier circuit for allowing a current to unidirectionally flow in the circuit in which the controller performs the alternative connection changeover.

* * * * *